(12) United States Patent
Freeman

(10) Patent No.: US 6,629,620 B1
(45) Date of Patent: Oct. 7, 2003

(54) FOOD SERVICE RECEPTACLE

(76) Inventor: Christine A. Freeman, 6239 W. Reynolds Rd., Haslett, MI (US) 48840

( * ) Notice: Subject to any disclaimer, the term of this patent is extended or adjusted under 35 U.S.C. 154(b) by 0 days.

(21) Appl. No.: 10/063,813

(22) Filed: May 15, 2002

(51) Int. Cl.⁷ .............................................. B65D 69/00
(52) U.S. Cl. .................... 220/23.88; 220/571; 220/832; 312/327; 312/328
(58) Field of Search ............................. 220/23.88, 571, 220/831, 832; 312/327, 328

(56) References Cited

U.S. PATENT DOCUMENTS

| | | | |
|---|---|---|---|
| 1,637,553 A | | 8/1927 | Coleman |
| 1,964,805 A | * | 7/1934 | Barnes ..................... 126/268 |
| 2,274,048 A | * | 2/1942 | Derman ....................... 312/31 |
| 2,421,264 A | * | 5/1947 | Herwig ........................ 53/145 |
| 2,526,602 A | * | 10/1950 | Crumrine .................... 206/305 |
| 2,550,998 A | * | 5/1951 | Hilliker ...................... 220/252 |
| 2,598,995 A | * | 6/1952 | Graff ............................. 126/3 |
| 3,052,508 A | * | 9/1962 | Fink ............................ 312/404 |
| 3,591,194 A | | 7/1971 | Vega |
| 4,817,808 A | | 4/1989 | Bracy |
| 4,934,549 A | | 6/1990 | Allen |
| 5,598,886 A | | 2/1997 | Criado-Mellado |
| 5,660,299 A | | 8/1997 | Harvey |
| 5,743,605 A | * | 4/1998 | Marino ........................ 312/211 |
| 5,801,331 A | * | 9/1998 | Zachrai ...................... 174/52.1 |
| 6,116,456 A | | 9/2000 | Davis |
| 6,209,346 B1 | | 4/2001 | Frosch |

* cited by examiner

Primary Examiner—Joseph M. Moy
(74) Attorney, Agent, or Firm—John M. Naber

(57) ABSTRACT

A food service receptacle suited for storing and protecting a variety of prepared food items using efficient and manageable containers to allow easy and efficient food transfer. One embodiment includes a box, a closure unit, specialized containers and support members. The box can be lined with a watertight material such as plastic or galvanized metal. The closure unit is hingedly mounted to said box and has openings covered by a netting material and also has a plurality of collapsible support arms to support an open position. The support members can be detachable and covered with a non-corrosive material at their bottom.

14 Claims, 3 Drawing Sheets

FOOD SERVICE RECEPTACLE

FIELD OF INVENTION

The present invention relates generally to the field of food service receptacles, and in particular to a free standing food receptacle that can be configured to accommodate outdoor use and accept a plurality of food containers that can be stored in residential refrigerators or ovens, and the like until the time of use.

BACKGROUND OF INVENTION

Receptacles for food service are generally well known in the art. Nevertheless, most are designed for specific purposes and are best suited for indoor use. Also, many are designed to store or transport large quantities of chilled or heated food or are otherwise self-contained. See generally, U.S. Pat. No. 6,116,456 to Davis. Also, many food service receptacles continuously expose the contents of the receptacle to the ambient atmosphere.

Frequently social gatherings involve outdoor parties such as graduation parties, pool parties and the like. Such parties may use a variety of food types that require chilling, heating, or storing until they are ready to serve. Further, refilling the receptacle can be difficult and time consuming. And finally, food placed outdoors will frequently bring unwanted crawling or flying guests such as flies, bees, and the like.

As a consequence of the foregoing situation, there has existed a longstanding need for a new and improved type of food box construction that contains a means to keep pests away, is configured to allow outdoor use, and provides an easy means to reload various food products while in use.

SUMMARY OF INVENTION

Accordingly, the present invention provides a food receptacle suited for storing and protecting a variety of prepared food items using efficient and manageable containers to allow easy food transfer.

Specifically, one embodiment of the invention includes a box having: a generally elongated rectangular reinforced construction having a front panel, a rear panel, two side panels, and a floor panel that are joined together to form an interior surface and an open top; a single closure unit hingedly mounted to the top of the rear panel dimensioned to completely cover the open top of the box and having a plurality of open lid panels having openings, the openings covered by a netting, and a pair of collapsible support arms such as "gas" shocks, air cylinders, or pneumatic cylinders known in the art. The collapsible support arms are operatively connected at one end on each end of the closure unit and operatively connected on another end to the side panels; a plurality of support members having one end attached to a bottom side of the box by attachment means and having a non-corrosive material attached to and covering a bottom end, and even wheels attached to a plurality of support member bottom ends; and a plurality of removable food containers configured for placement within the box.

The present invention can be constructed of a wood, plastic, or stainless steel. The support members can be removable by use of, for example, a screw on the support member and a corresponding threaded bore on the box.

Additional features that can be included in the present invention are: a floor drain in the floor panel; the interior surface of the box further lined with a watertight surface such as plastic or galvanized metal or an insulative surface; and handles can be added to the exterior surfaces of the box side panels.

Other features and advantages of the present invention will become more apparent to persons having ordinary skill in the art to which the present invention pertains from the following description taken in conjunction with the accompanying figures.

BRIEF DESCRIPTION OF DRAWINGS

The foregoing advantages and features, as well as other advantages and features, will become apparent with reference to the description and figures below, in which like numerals represent like elements and in which.

DETAILED DESCRIPTION

The present invention generally involves the field of food service receptacles, and in particular to a free standing food receptacle that can be configured to accommodate outdoor use and accept a plurality of food containers that can be stored in residential refrigerators or ovens, and the like until the time of use.

Figure 1:
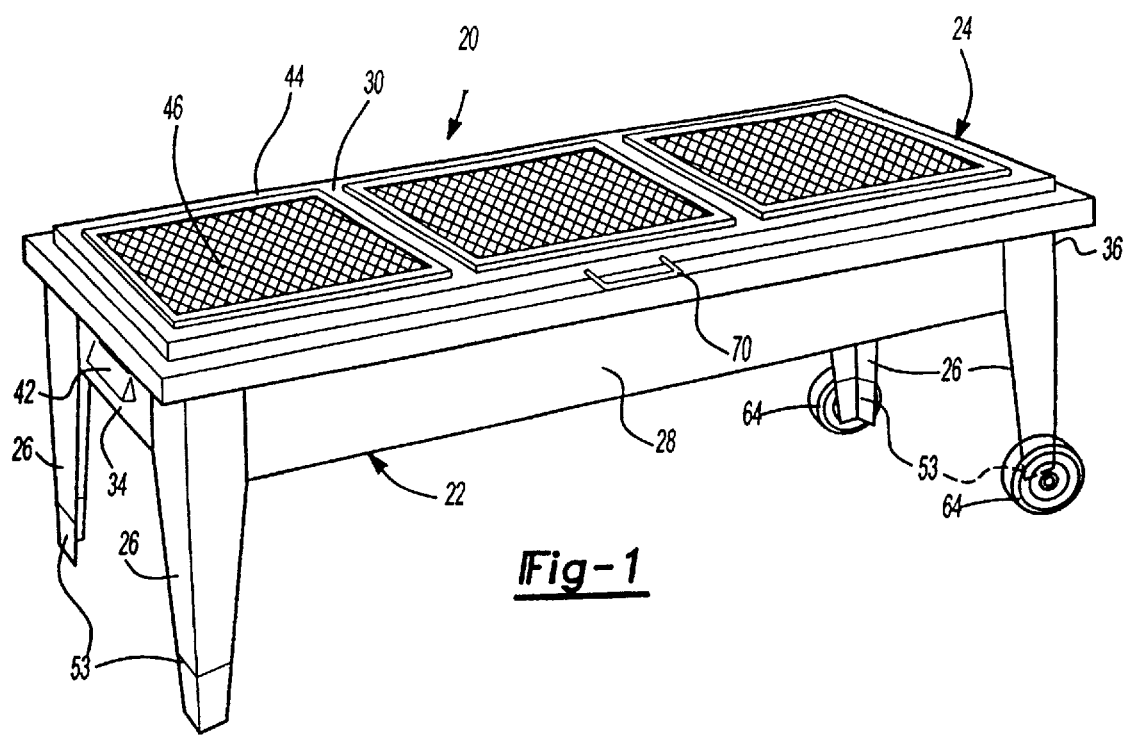
FIG. 1 is a perspective view of the food service receptacle that forms the basis of the present invention in a closed position.

As can be seen by reference to the drawings, and in particular to FIG. 1, one embodiment of a food service receptacle construction of the present invention is generally designated by the reference number 20. The receptacle 20 generally has a box 22, a closure unit 24, and a plurality of support members 26.

Figure 2:
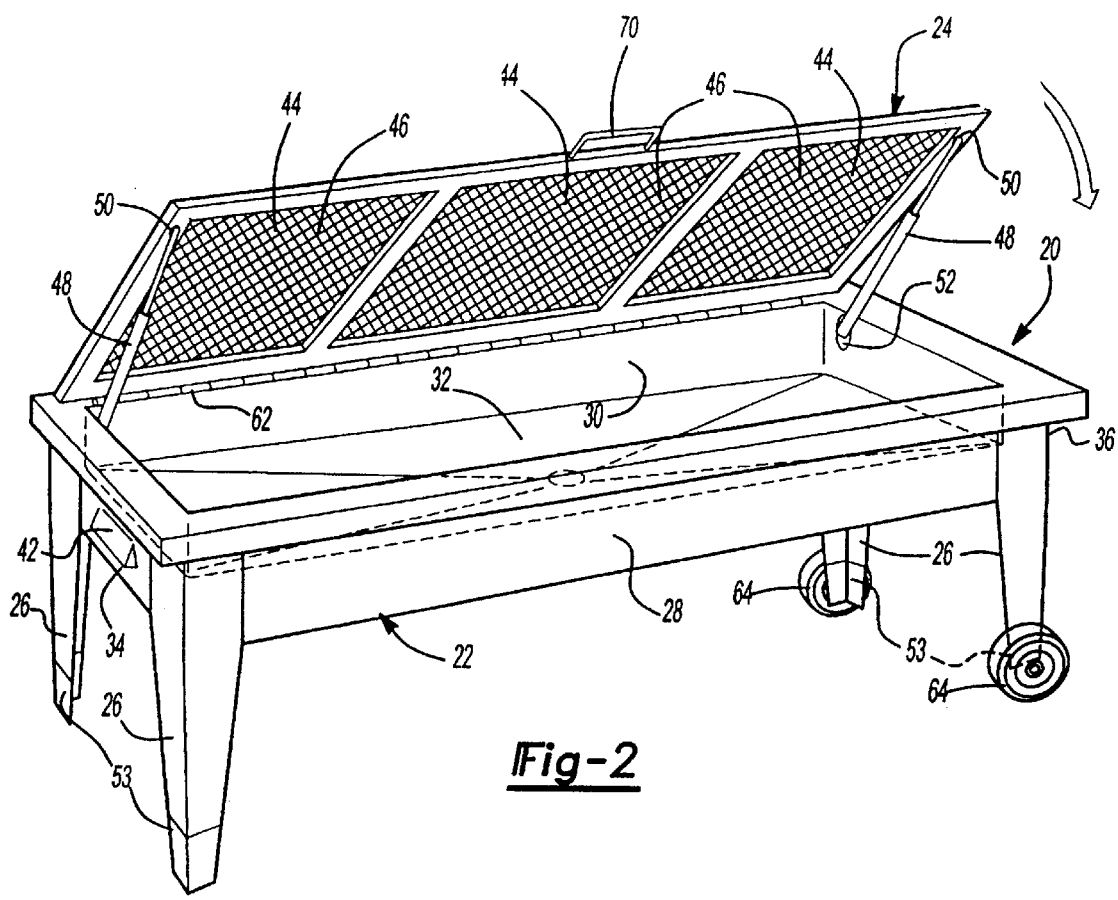
FIG. 2 is a perspective view of the present invention in an open position.

As shown in FIGS. 1 and 2, the receptacle box 22 can be a generally elongated rectangular reinforced construction made from a variety of materials such as plastic, wood, or stainless steel and having an elongated front 28, rear 30, and floor 32 panels and a pair of side panels 34 and 36. The panels are joined together to form an interior surface and an open top. All of the panels can be provided with a generally rectangular internal support framework (not shown) well known in the art. The floor panel 32 can have a floor drain 38 disposed in the center, for example. All interior surfaces can be lined with watertight and insulated materials. The dimensions of the box 22 can be sized to accommodate delivery within a pick-up truck.

To accommodate outdoor use, the box lining can be a molded plastic or a shaped and welded sheet of galvanized metal. These durable materials allow for placement of ice within the box 22 and withstand repeated outdoor use. Carrying handles 42 can be optionally attached to the exterior surface of the side panels 34 and 36 to facilitate the transport of the receptacle 20 from one location to another.

Turning again to FIGS. 1 and 2, it can be seen that the closure unit 24 comprises a plurality of open lid panels 44. The closure unit 24 can be hingedly mounted by, for example, a hinge 62, to the top of the rear panel 30 of the box 22. The open lid panels 44 have openings and can be covered with a variety of materials to keep pests away such as a screen 46 or other nettings. The open lid panels 44 can be removably attached to the closure unit 24. This would facilitate easy replacement of screening material. The closure unit 24 is dimensioned to completely cover the opening of the top of the box 22 in its closed position.

FIG. 2 illustrates the closure unit 24 in an open position. As best illustrated in FIG. 2, the closure unit 24 can also have a pair of collapsible support arms 48 which are operatively connected on each end of the closure unit 24 at 50 and operatively connected on the other end at 52 to an exposed surface of side panels 34, and 36. The support arms 48 are of the conventional "stay open-stay closed" variety such as "gas" shocks, air cylinders, or pneumatic cylinders, but in one preferred embodiment an air cylinder is used. In an alternate embodiment, the hinge 62 can be an adjustable pressure hydraulic hinge known in the art. This would eliminate the need for the support arms 48. Other features of the closure unit 24 can include a closure unit handle 70 and a covering (not shown), made from any number of materials such as oil cloth, to keep debris out of the receptacle 20 when not in use.

FIGS. 1 and 2 also show the plurality of support members 26 attached to the bottom side of the floor panel 34. The numbers, length, and shape of support members 26 can be adjusted to meet the user's needs based on particular uses and size of the receptacle 20. The top end of these support members 26 can be permanently attached by an attachment means to the box 22 or removable (not shown) using screws or other various connectors known in the art. The screw could be attached to the support member top end and attached to a corresponding threaded bore on the box 22. To better facilitate outdoor use, the support members 26 can have a non-corrosive material such as galvanized metal feet 53 attached to and covering their bottom ends. Wheels 64 also can be attached to the bottom ends of support members 26.

Figure 3:
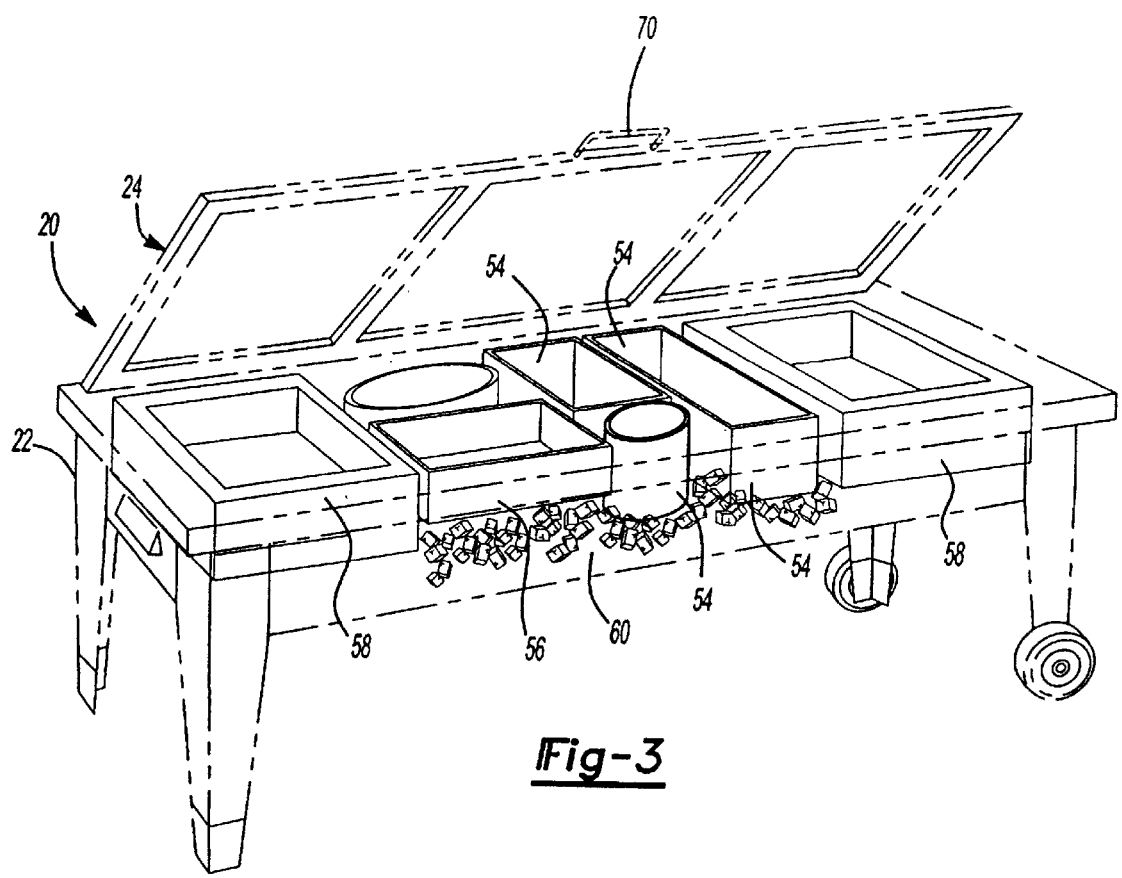
FIG. 3 is a perspective view of a variety of food container possibilities disposed within the receptacle.

Other features of the present invention are illustrated in FIG. 3. FIG. 3 shows a plurality of removable containers specifically configured to accommodate a variety of hot, cold or ambient temperature foods. All containers must allow the closure unit 24 to close when installed in the box 22 and storeable until needed within a residential refrigerator, oven, and the like. Various sizes and combinations of simple containers 54 are possible. The containers can be made of various materials based on their intended use such as stainless steel for hot foods, etc. Cold food containers 56 can be shallow enough to allow the closure unit 24 to close even when the container is sitting in ice 60. Insulated containers 58 are also possible to maintain food temperature hot or cold. The containers can have matching covers to keep food fresh, etc.

An advantage of the containers 54, 56 and 58 is the ability to quickly and efficiently swap the various containers when empty with a similar container stored either in an oven, refrigerator or other convenient location out-of-sight. This is particularly useful for caterers or large social gatherings. The containers 54, 56 and 58 also ensure the ability to close the closure unit 24.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A food service receptacle, comprising:

a box having a generally elongated rectangular reinforced construction having a front panel, a rear panel, two side panels, and a floor panel that are joined together to form an interior surface and an open top;

a single closure unit hingedly mounted to the top of said rear panel dimensioned to completely cover the open top of said box and having a plurality of open lid panels having openings, the openings covered by a netting, and a plurality of collapsible support arms operatively connected at one end on each end of said closure unit and operatively connected on another end to said side panels;

a plurality of support members having one end attached to a bottom side of the box by attachment means and having a non-corrosive material attached to and covering a bottom end of said support members; and a plurality of removable food containers configured for placement within the box.

2. The food service receptacle of claim 1, wherein said box is constructed of wood.

3. The food service receptacle of claim 1, wherein said box is constructed of plastic.

4. The food service receptacle of claim 1, wherein said box is constructed of stainless steel.

5. The food service receptacle of claim 1, wherein said floor panel has a floor drain.

6. The food service receptacle of claim 1, wherein said interior surface is further lined with a watertight surface.

7. The food service receptacle of claim 6, wherein said watertight surface is galvanized metal.

8. The food service receptacle of claim 6, wherein said watertight surface is molded plastic.

9. The food service receptacle of claim 1, wherein said box further comprises handles attached to an exterior surface of said box side panels.

10. The food service receptacle of claim 1, wherein said support member attachment means comprises a screw and said box comprises a corresponding threaded bore.

11. The food service receptacle of claim 1, wherein said interior surface is further lined with an insulative material.

12. The food service receptacle of claim 1, further comprising wheels attached to said plurality of support member bottom ends.

13. The food service receptacle of claim 1, wherein said open lid panels are removably attached to the closure unit.

14. The food service receptacle of claim 1, wherein said collapsible support arms are air cylinders.

* * * * *